(12) United States Patent  (10) Patent No.: US 7,814,320 B2
Mackenzie et al.  (45) Date of Patent:  Oct. 12, 2010

(54) CRYPTOGRAPHIC AUTHENTICATION, AND/OR ESTABLISHMENT OF SHARED CRYPTOGRAPHIC KEYS, USING A SIGNING KEY ENCRYPTED WITH A NON-ONE-TIME-PAD ENCRYPTION, INCLUDING (BUT NOT LIMITED TO) TECHNIQUES WITH IMPROVED SECURITY AGAINST MALLEABILITY ATTACKS

(75) Inventors: Philip Mackenzie, San Jose, CA (US); Zulfikar Amin Ramzan, San Mateo, CA (US); Craig B. Gentry, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1037 days.

(21) Appl. No.: 11/486,510

(22) Filed: Jul. 14, 2006

(65) Prior Publication Data

US 2007/0067629 A1   Mar. 22, 2007

Related U.S. Application Data

(60) Provisional application No. 60/700,769, filed on Jul. 19, 2005.

(51) Int. Cl.
*H04L 9/32* (2006.01)
*H04L 9/12* (2006.01)
*H04L 9/16* (2006.01)

(52) U.S. Cl. .................... 713/168; 713/169; 713/170; 713/171; 713/182; 713/159; 380/229

(58) Field of Classification Search ............ None
See application file for complete search history.

(56) References Cited

U.S. PATENT DOCUMENTS 5,241,599 A   8/1993   Bellovin et al.
5,440,635 A   8/1995   Bellovin et al.
6,226,383 B1   5/2001   Jablon
6,411,715 B1 *  6/2002   Liskov et al. ............... 380/277
6,757,825 B1   6/2004   Mackenzie et al.
6,792,533 B2 *  9/2004   Jablon ........................ 713/171

(Continued)

OTHER PUBLICATIONS

Password Authenticated Key Exchange Protocol with Stronger Security Ding Xiao-fei, Ma Chuan-gui, Cheng Qing-feng Educational Technology and Computer Science, 2009. ETCS '09. First International Workshop. Mar. 7-8, 2009.*
M. Abdalla and D. Pointcheval. Simple Password-Based Encrypted Key Exchange Protocols. In *RSA Conference, Cryptographer's Track*, CT-RSA 05, LNCS 3376, pp. 191-208, 2005.

(Continued)

*Primary Examiner*—Syed A. Zia
(74) *Attorney, Agent, or Firm*—Haynes and Boone, LLP; Michael Shenker (57) ABSTRACT

Using a password ($\pi$), a client (C) computes part ($H_1(<C, \pi_C>)$) of the password verification information of a server (S), and together they use this information to authenticate each other and establish a cryptographic key (K'), possibly using a method resilient to offline dictionary attacks. Then over a secure channel based on that cryptographic key, the server sends an encryption ($EE_{<C,\pi>}(sk)$) of a signing key (sk) to a signature scheme for which the server know a verification key (pk). The encryption is possibly non-malleable and/or includes a decryptable portion ($E_{<C,\pi>}(sk)$) and a verification portion ($H_8(sk)$) used to verify the decrypted value obtained by decrypting the decryptable portion. The signing key is based on the password and unknown to the server. The client obtains the signing key using the password, signs a message, and returns the signature to the server. The server verifies this signature using the verification key, hence getting additional proof that the client has knowledge of the password. The client and the server generate a shared secret key (K"), more secure than the password, for subsequent communication.

33 Claims, 3 Drawing Sheets

U.S. PATENT DOCUMENTS

| | | | |
|---|---|---|---|
| 6,952,771 B1* | 10/2005 | Zuccherato et al. | 713/170 |
| 6,988,198 B1* | 1/2006 | Zuccherato et al. | 713/170 |
| 7,073,068 B2* | 7/2006 | Jakobsson et al. | 713/184 |
| 7,076,656 B2* | 7/2006 | MacKenzie | 713/171 |
| 7,149,311 B2* | 12/2006 | MacKenzie et al. | 380/286 |
| 7,359,507 B2* | 4/2008 | Kaliski | 380/30 |
| 7,493,488 B2* | 2/2009 | Lewis et al. | 713/170 |
| 7,522,723 B1* | 4/2009 | Shaik | 380/30 |
| 2002/0067832 A1* | 6/2002 | Jablon | 380/277 |
| 2003/0079124 A1* | 4/2003 | Serebrennikov | 713/156 |
| 2003/0221102 A1* | 11/2003 | Jakobsson et al. | 713/171 |
| 2003/0229788 A1* | 12/2003 | Jakobsson et al. | 713/171 |
| 2004/0030932 A1* | 2/2004 | Juels et al. | 713/202 |
| 2004/0234074 A1* | 11/2004 | Sprunk | 380/28 |
| 2006/0041759 A1* | 2/2006 | Kaliski et al. | 713/184 |
| 2006/0095769 A1* | 5/2006 | Zuccherato et al. | 713/170 |

OTHER PUBLICATIONS

M. Bellare, D. Pointcheval, and P. Rogaway. Authenticated key exchange secure against dictionary attacks. In *EUROCRYPT 2000* (LNCS 1807), pp. 139-155, 2000.

M. Bellare and P. Rogaway. Random oracles are practical: A paradigm for designing efficient protocols. In $1^{st}$ *ACM Conference on Computer and Communications Security*, pp. 62-73, Nov. 1993.

M. Bellare and P. Rogaway. Entity authentication and key distribution. In *CRYPTO '93* (LNCS 773), pp. 232-249, 1993.

M. Bellare and P. Rogaway. Provably secure session key distribution—the three party case. In $27^{th}$ *ACM Symposium on the Theory of Computing*, pp. 57-66, 1995.

S. M. Bellovin and M. Merritt. Encrypted key exchange: Password-based protocols secure against dictionary attacks. In *IEEE Symposium on Research in Security and Privacy*, pp. 72-84, 1992.

S. M. Bellovin and M. Merritt. Augmented encrypted key exchange: A password-based protocol secure against dictionary attacks and password file compromise. In *ACM Conference on Computer and Communications Security*, pp. 244-250, 1993.

D. Boneh. The decision Diffie-Hellman problem. In *Proceedings of the Third Algorithmic Number Theory Symposium* (LNCS 1423), pp. 48-63, 1998.

V. Boyko, P. MacKenzie, and S. Patel. Provably secure password authentication and key exchange using Diffie-Hellman. In *EUROCRYPT 2000* (LNCS 1807), pp. 156-171, 2000.

R. Canetti, S. Halevi, J. Katz, Y. Lindell, and P. MacKenzie. Universally-composable password-based key exchange. To appear in *Eurocrypt*, 2005.

R. Cox, E. Grosse, R. Pike, D. Presotto, and S. Quinlan. Security in Plan 9. In *Usenix Security Symposium* 2002.

R. Cramer and V. Shoup. A practical public key cryptosystem provably secure against adaptive chosen ciphertext attack. In *CRYPTO '98* (LNCS 1462), pp. 13-25, 1998.

W. Diffie and M. Hellman. New directions in cryptography. *IEEE Trans. Info. Theory*, 22(6):644-654, 1976.

W. Ford and B. S. Kaliski, Jr. Server-assisted generation of a strong secret from a password. In *Proceedings of the $5^{th}$ IEEE International Workshop on Enterprise Security*, 2000.

R. Gennaro and Y. Lindell. A Framework for Password-Based Authenticated Key Exchange. *Advances in Cryptology—Eurocrypt 2003*, LNCS vol. 2656, Springer-Verlag, pp. 524-543, 2003.

O. Goldreich and Y. Lindell. Session-Key Generation using Human Passwords Only. In *CRYPTO 2001* (LNCS 2139), pp. 408-432, 2001.

L. Gong. Optimal authentication protocols resistant to password guessing attacks. In $8^{th}$ *IEEE Computer Security Foundations Workshop*, pp. 24-29, 1995.

L. Gong, T. M. A. Lomas, R. M. Needham, and J. H. Saltzer. Protecting poorly chosen secrets from guessing attacks. *IEEE Journal on Selected Areas in Communications*, 11(5):648-656, Jun. 1993.

S. Halevi and H. Krawczyk. Public-key cryptography and password protocols *ACM Transactions on Information and System Security* (TISSEC), vol. 2, No. 3, pp. 230-268, Aug. 1999. ACM. (Preliminary version) appeared in the 5th ACM-CCS, pp. 122-131. 1998. ACM.

IEEE Standard 1363-2000, Standard specifications for public key cryptography, 2000.

D. Jablon. Strong password-only authenticated key exchange. *ACM Computer Communication Review*, ACM SIGCOMM, 26(5):5-20, 1996.

D. Jablon. Extended password key exchange protocols immune to dictionary attack. In *WETICE'97 Workshop on Enterprise Security*, 1997.

D. Jablon Password authentication using multiple servers. In *RSA Conference 2001, Cryptographers' Track* (LNCS 2020), pp. 344-360, 2001.

S. Jiang and G. Gong. Password based key exchange with mutual authentication. In *Workshop on Selected Areas of Cryptography* (SAC), 2004.

J. Katz, R. Ostrovsky, and M. Yung. Efficient password-authenticated key exchange provably secure under standard assumptions. In *Eurocrypt 2001* (LNCS 2045), pp. 475-494, 2001.

J. Katz and M. Yung. Complete characterization of security notions for probabilistic private-key encryption. In *ACM Symposium on Theory of Computing*, pp. 245-254, 2000.

C. Kaufmann and R. Perlman. PDM: A New Strong Password-Based Protocol. In *Usenix Security Symposium*, 2001.

T. Kwon. Authentication and Key Agreement via Memorable Passwords. In *2001 Internet Society Network and Distributed System Security Symposium*, 2001.

S. Lucks. Open key exchange: How to defeat dictionary attacks without encrypting public keys. In *Proceedings of the Workshop on Security Protocols*, 1997.

P. MacKenzie, S. Patel, and R. Swaminathan. Password authenticated key exchange based on RSA. In *ASIACRYPT 2000* (LNCS 1976), pp. 599-613, 2000.

P. MacKenzie. More Efficient Password-Authenticated Key Exchange, RSA Conference, Cryptographer's Track (LNCS 2020), pp. 361-377, 2001.

P. MacKenzie. The PAK suite: Protocols for password-authenticated key exchange. DIMACS Technical Report 2002-46, Oct. 2002.

National Institute of Standards and Technology (NIST). Announcing the Secure Hash Standard, FIPS 180-1, U.S. Department of Commerce, Apr. 1995.

S. Patel. Number theoretic attacks on secure password schemes. In *Proceedings of the IEEE Symposium on Research in Security and Privacy*, pp. 236-247, 1997.

Phoenix Technologies. http://www.phoenix.com/, 2005.

R. Rivest, A. Shamir, and L. Adleman. A method for obtaining digital signature and public key cryptosystems. *Communications of the ACM*, 21:120-126, 1978.

M. Roe, B. Christianson, and D. Wheeler. Secure sessions from weak secrets. Technical report, University of Cambridge and University of Hertfordshire, 1998.

C. P. Schnorr. Efficient identification and signatures for smart cards. In *Crypto '89* (LNCS 435), pp. 235-251, 1990.

M. Steiner, G. Tsudik, and M. Waidner. Refinement and extension of encrypted key exchange. *ACM Operating System Review*, 29:22-30, 1995.

T. Wu. The secure remote password protocol. In *1998 Internet Society Network and Distributed System Security Symposium*, pp. 97-111, 1998.

T. Wu. A real-world analysis of Kerberos password security. In *Proceedings of the 1999 Network and Distributed System Security Symposium*, Feb. 1999.

T. Wu. Telnet authentication: SRP. IETF RFC 2944, 2000.

T. Wu. The SRP authentication and key exchange system. IETF RFC 2945, 2000.

T. Wu. SRP open source password utility. http://srp.stanford.edu/, 2005.

M. Zhang. New Approaches to Password Authenticated Key Exchange Based on RSA. In *ASIACRYPT*, pp. 230-244, 2004.

* cited by examiner

CRYPTOGRAPHIC AUTHENTICATION, AND/OR ESTABLISHMENT OF SHARED CRYPTOGRAPHIC KEYS, USING A SIGNING KEY ENCRYPTED WITH A NON-ONE-TIME-PAD ENCRYPTION, INCLUDING (BUT NOT LIMITED TO) TECHNIQUES WITH IMPROVED SECURITY AGAINST MALLEABILITY ATTACKS

CROSS REFERENCE TO RELATED APPLICATIONS

The present application claims priority of U.S. provisional patent application No. 60/700,769, filed Jul. 19, 2005, incorporated herein by reference.

BACKGROUND OF THE INVENTION

This present invention relates to cryptography, and more particularly to authentication and to establishing a shared cryptographic key by two parties by means of a (possibly short) secret about which the two parties have information.

Consider two parties, Alice and Bob. Alice and Bob may be implemented via hardwired and/or software programmable circuitry capable of performing processing logic. Suppose Alice and Bob desire to communicate securely over an insecure network, but their only means of verifying each other's identity consists of a short secret password (e.g., a 4-digit PIN number), for which Alice knows the password itself, and Bob knows at least some "password verification information". In particular, it is possible that neither of them knows a public key corresponding to the other party, and neither has a certified public key (i.e., a public key whose certificate can be verified by the other party). In this scenario, Alice needs to be concerned not only with eavesdroppers that may try to steal the password by listening in on her communications, but also with the party with whom she is communicating, since a priori she cannot even be sure she is communicating with Bob. Bob's situation is similar.

If Alice and Bob shared a high-strength cryptographic key (i.e., a long secret), then this problem could be solved using standard solutions well-known in the art for setting up a secure channel, such as the protocol of Bellare and Rogaway [4]. However, since Alice and Bob only have information about a short secret password, they may also be concerned with offline dictionary attacks. An offline dictionary attack occurs when an attacker obtains some password verification information that can be used to perform offline verification of password guesses. For example, suppose Alice and Bob share a password $\pi$, and an attacker somehow obtained a hash of the password $h(\pi)$, where h is some common cryptographic hash function such as SHA-1 [39]. Then the attacker could go offline and run through a dictionary of possible passwords $\{\pi_1, \pi_2, \ldots\}$, testing each one against $h(\pi)$. For instance, to test if $\pi_i$ is the correct password, the attacker computes $h(\pi_i)$ and checks if $h(\pi_i)=h(\pi)$. In general, the password verification information obtained by the attacker may not be as simple as a hash of a password, and an attacker may not always be able to test all possible passwords against the password verification information, but if he can test a significant number of passwords, this is still considered an offline dictionary attack. Wu [47] describes how effective an offline dictionary attack can be.

Accordingly, it is desirable to establish a protocol for communication between Alice and Bob so that they can bootstrap information about a short secret (the password) into a long secret (a cryptographic key) that can be used to provide a secure channel.

Such protocols are called in the art password-authenticated key exchange (PAKE) protocols. Informally, a PAKE protocol is secure if the only feasible way to attack the protocol is to run a trivial online dictionary attack of simply iteratively guessing passwords and attempting to impersonate one of the parties. (This type of attack can generally be detected and stopped by well-known methods, as discussed below.) The problem of designing a secure PAKE protocol was proposed by Bellovin and Merritt [6] and by Gong et al. [21], and has since been studied extensively.

If the PAKE protocol designates one of Alice or Bob as a client, and the other one as a server, and if it guarantees that a compromise of the server does not reveal any information that could be used to impersonate the client without performing at least an offline dictionary attack, then the protocol is said to have resilience against server compromise. Such a protocol is also called an augmented PAKE protocol. This problem of designing an augmented PAKE protocol was proposed by Bellovin and Merritt [7], and has also been studied extensively. In the foregoing, many techniques in the art that have been proposed to solve this problem will be discussed.

One major application of PAKE is to bootstrap a public key infrastructure (PKI). Specifically, a user can use a PAKE protocol to set up a secure channel to a credential store to securely download his certificate for a public key and the corresponding private key. Thus a user does not need to be concerned about storing his private key on his local device, where it may be stolen—laptop theft is a major problem—or it may simply be lost, say if the hard drive of the user's device is damaged from falling on the ground. One example of a system that uses a PAKE protocol in such a way is Plan9, and more specifically, SecureStore in Plan9 [14].

Previous Solutions

Many common password authentication techniques in the art are unilateral authentication techniques, that is, only one party (a user or client) is authenticated to the other party (a server), but not vice-versa. (On the other hand, a PAKE protocol as described above is a mutual authentication technique.) For convenience we will apply the labels client and server to describe the two principals Alice and Bob, bearing in mind, however, that these terms are merely convenient labels.

One simple technique is for the client to send a password to the server without any form of cryptographic protection. This type of authentication is used in some older Internet applications, as well as many web-based mail applications. However, this is insecure against an eavesdropper on the network. This technique might be acceptable on channels wherein eavesdropping is relatively difficult.

A more advanced technique is challenge-response, wherein the server sends a challenge to the client, and the client responds with a message depending on the challenge and the password, for instance the hash of the challenge and password concatenated. This type of authentication is used in some operating systems to enable network access. However, this technique is vulnerable to an offline dictionary attack by an eavesdropper since the challenge and its corresponding response, together, make password verification information. An attacker eavesdropping on the communication could take the transcript of the conversation (i.e., the challenge and the hash value), and try all possible passwords until one matches.

A more secure technique involves sending a password to the server over an anonymous secure channel, wherein the server has been verified using a public key. This type of authentication is used in some remote terminal applications, as well as web-based applications, and it depends intrinsically on the ability of the client to verify the server's public key. When used on the web, the public key of the server is certified by a certification authority that is presumably trusted by the client. For remote terminal applications, there typically is no trusted third party, and security relies on the client recognizing the public key, perhaps with a "fingerprint," or hash, of the public key. As long as the server's public key can be verified, this type of authentication is secure. However, if the server's public key cannot be verified, then this type of authentication is vulnerable to an attacker that is able to impersonate the server. For instance, in the web-based application, this could occur if the attacker obtains a certificate improperly, and in a remote terminal application, this could occur if the client machine has not previously stored the public key of the server.

Accordingly, it is desirable to find a Password Authenticated Key Exchange (PAKE) algorithm secure against offline dictionary attack. Such security should be achieved at least when no participants are compromised. If a party has been compromised by an adversary, the adversary may obtain some password verification information which will defeat the security against an offline dictionary attack. However, if for example the server is compromised, it is desirable that while the offline dictionary attack security may be defeated, the protocol would be resilient to server comprise.

It will be understood that it is the objective of any PAKE protocol to be secure against offline dictionary attacks. Since the PAKE problem was introduced, it has been studied extensively, and many PAKE protocols have been proposed, e.g., [7, 21, 20, 24, 25, 34, 45, 46, 33, 32]. Many of these protocols have been shown to be insecure [10, 40]. It is therefore desirable to develop a protocol that can be proven secure according to some reasonable cryptographic assumption. Many of these PAKE protocols also claim to be resilient to server compromise, e.g., [7, 25, 46, 33, 38], and it is also desirable to develop protocols that can be proven to be resilient to server compromise according to some reasonable cryptographic assumption.

More recent PAKE protocols have proofs of security, based on certain well-known cryptographic assumptions, although some of these proofs assume the existence of ideal hash functions or ideal ciphers (i.e. black-box perfectly-random functions or keyed permutations, respectively). Such a means is commonly used by those skilled in the cryptographic arts to provide a mathematical proof of security of their work to others skilled in the art. A few recent papers [2, 12, 1] present refinements of the EKE protocol of [7] and prove security based on the Diffie-Hellman (DH) assumption [16]. The first assumes both ideal ciphers and ideal hashes, while the others assume only ideal hashes. Other papers [35, 51] present refinements of the OKE protocol of [34] and prove security based on the RSA assumption [42]. These all assume ideal hashes. Another paper [30] presents new protocol based on a variant of the Cramer-Shoup cryptosystem [15] and proves security based on the decisional DH assumption (see, e.g., [11]), assuming only a public random string (not an ideal hash function). Some variants of the [30] protocol are presented in [18, 29, 13]. Another password-authenticated key exchange protocol was developed in [19] and proven secure based on trapdoor permutations without any setup assumptions, but with a restriction that concurrent sessions with the same password are prohibited.

In terms of resilience to server compromise, the following papers contain protocols that have proofs of security assuming the existence of ideal hash functions [12, 37, 35].

For the purposes of bootstrapping PKI, it has been noticed that one may not need a full PAKE protocol, but just a password-based protocol designed solely for downloading a set of credentials (or at least a static cryptographic key used to decrypt an encrypted set of credentials). One protocol that does this is [17], and a variant is [26]. Security for these protocols relies on a non-standard assumption related to Diffie Hellman.

Previous Password Authenticated Key Exchange schemes have been implemented in commercial products and have been specified for use within several technology standards. The SRP protocol [46] has been implemented for a variety of applications, including telnet and ftp [50]. There are also two IETF RFCs related to SRP: RFC 2944 [48] and RFC 2945 [49]. The SPEKE protocol [24] has been implemented and is available [41] for licensing. The PAK protocol [12] has been implemented and is used in the SecureStore protocol [14].

There are currently PAKE standards being developed in the IEEE P1363 working group and in ISO/IEC 11770-4 working group. The IEEE P1363 working group is developing the P1363.2 draft standard specifications for password-based public key cryptographic techniques, which is likely to include PAK [12], SPEKE [24], SRP [46], AMP [33], and the Ford-Kaliski/Jablon protocol [17,26], along with variations of these protocols. The ISO/IEC 11770-4 draft standards will most likely include all of these except PAK.

Figure 1:
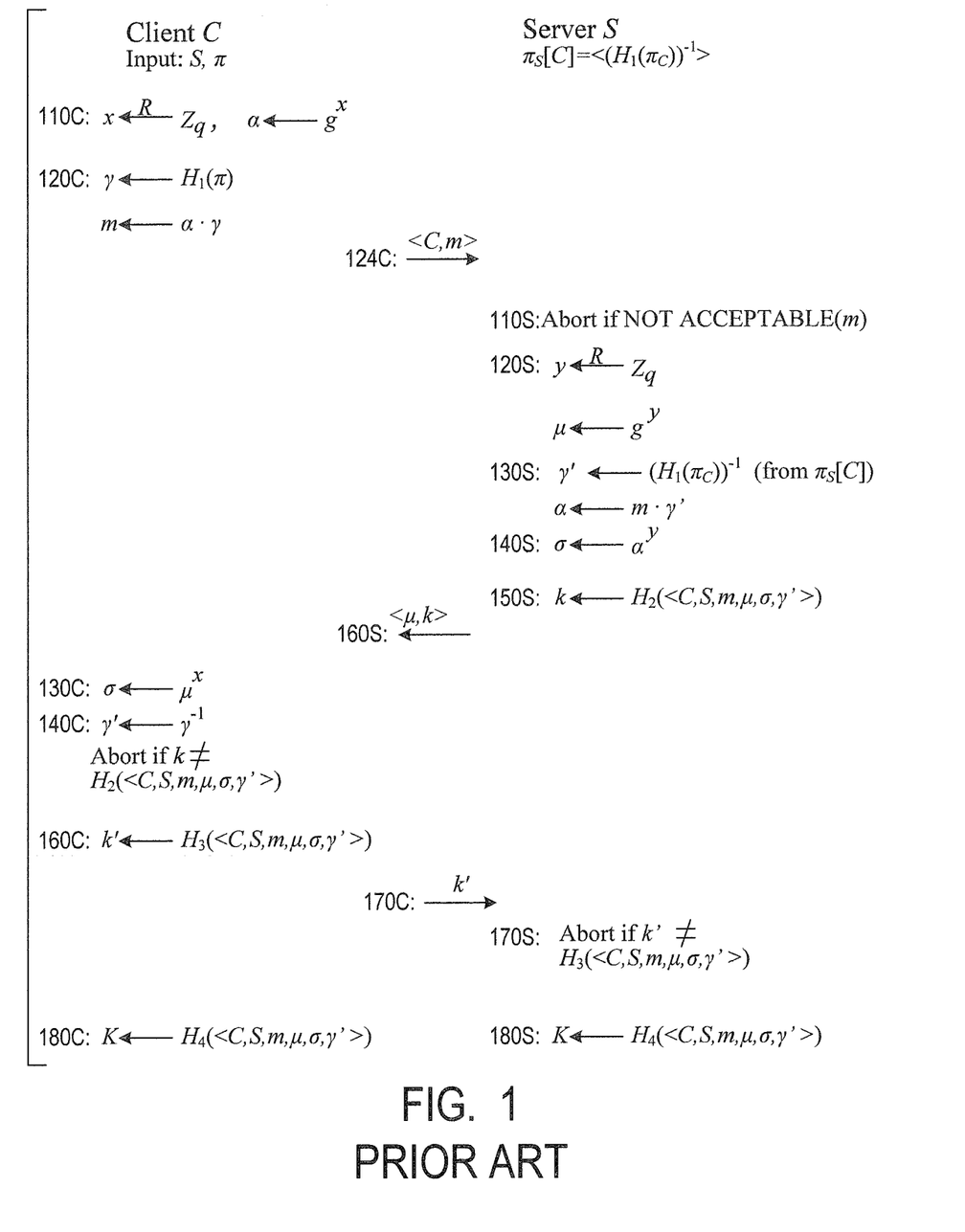
FIGS. 1 and 2 are flowcharts of prior art PAKE methods.

FIG. 1 illustrates a PAKE protocol described in [38]. In this protocol, a client C (e.g., Alice) and a server S (e.g. Bob) authenticate each other by proving to each other that each knows password authentication information $H_1(\pi)$ wherein $\pi$ is the password and $H_1()$ is a hash function. Also, the client C and the server S generate a long secret key K which can be used for symmetric encryption between C and S in a subsequent session.

The function $H_1()$ maps passwords into a finite cyclic group $G_q$ of an order q. $G_q$ can be a subgroup of the multiplicative group $Z_P^*$ of the ring $Z_p$, of integers modulo a prime number p. Element g is a generator of $G_q$, Symbols $H_i$ (e.g. $H_2$, $H_3$, $H_4$) denote various hash functions. For example, the following hash functions can be used:

$$H_i(x)=H(ASCII(i)\|x) \tag{1}$$

where H( ) is the SHA-1 function or some other hash function. The functions $H_1$ and $H_2$ have values in $G_q$, so if $G_q$ is a subgroup of $Z_p^*$, then for i=1, 2 one can set $$H_i(x)=H(ASCII(i)\|x) \bmod p. \tag{2}$$

Other suitable hash functions are described in [38].

For better security, neither the client C nor the server S need to store the password $\pi$. The client C can receive the password and the server's name S as input from a user via a keyboard or some other input device. For each client C having a password $\pi=\pi_C$, the server stores a database record $\pi S[C]$ which may include the value $H_1(\pi_C)$. In FIG. 1, the server stores instead the inverse value $H_1(\pi_C)^{-1}$ to improve the computational efficiency (as will be made clear below in connection with step 130S).

Step 110C is performed by the client C as in the Diffie-Hellman (DH) secret key exchange protocol. More particularly, the client generates a random element x of $Z_q$ (i.e., x is an integer from 0 to q-1), and computes $\alpha=g^x$. At step 120C, the client computes $H_1(\pi)$ and then computes $m=\alpha \cdot H_1(\pi)$. At step 124C, the client sends its name C and the value m to the server.

At step 110S, the server performs some simple checking on m (using a function ACCEPTABLE( )), and aborts if this check fails. The check can be that m mod p is not 0. At step 120S, the server generates a random y in $Z_q$ and computes $\mu=g^y$. At step 130S, the server uses its stored value $H_1(\pi_C)^{-1}$ to compute the client's value $\alpha$ (see step 110C):

$$\alpha = m \cdot H_1(\pi_C)^{-1}.$$

At step 140S, the server computes the DH shared key value $\sigma=\alpha^y$ (this value is equal to $g^{xy}$). At step 150S, the server computes a value $k=H_2(<C,S,m,\mu,\sigma,H_1(\pi_C)^{-1}>)$. At step 160S, the server sends the values $\mu$, k to the client to prove that the server knows $H_1(\pi_C)^{-1}$ (and hence $H_1(\pi_C)$ assuming that inverting $H_1(\pi_C)^{-1}$ is easy in $G_q$; of note, the inversion can be easily done in $Z_p^*$ using the Extended Euclidean Algorithm).

The client verifies the server's proof at steps 130C, 140C. More particularly, at step 130C, the client computes $\sigma$ as $\mu^x$. At step 140C, the client computes $H_1(\pi)^{-1}$, then $H_2(<C,S,m,\mu,\sigma,H_1(\pi)^{-1}>)$, and aborts if this latter value does not equal the server's k. At step 160C, the client generates a value $k'=H_3(<C,S,m,\mu,\sigma,H_1(\pi_C)^{-1}>)$ and sends this value to the server (step 170C) as a proof that the client knows $H_1(\pi)$. At step 170S, the server verifies the proof by computing $H_3(<C,S,m,\mu,\sigma,H_1(\pi_C)^{-1}>)$ and checking that this value equals k'.

At respective steps 180C, 180S, the client and the server each generate a shared session key $K=H_4(<C,S,m,\mu,\sigma,H_1(\pi_C)^{-1}>)$. K can be a long key.

Of note, the information send over the network (i.e. the values C, m, $\mu$, k, k') is difficult to use for an offline dictionary attack. For example, the use of $\sigma$ in the expressions for k and k' (steps 150S, 160C), and the use of the random number y in generating $\sigma$, make it difficult to mount an offline dictionary attack even if the communications between C and S are intercepted.

However, if an adversary compromises the server S, the adversary can obtain the value $H_1(\pi)^{-1}$ from $\pi_S[C]$ and compute $H_1(\pi)$. The adversary can then impersonate the client C because the protocol does not require the client to prove knowledge of any information about $\pi$ other than $H_1(\pi)$. Hence, the protocol is not resilient against server compromise.

Figure 2:
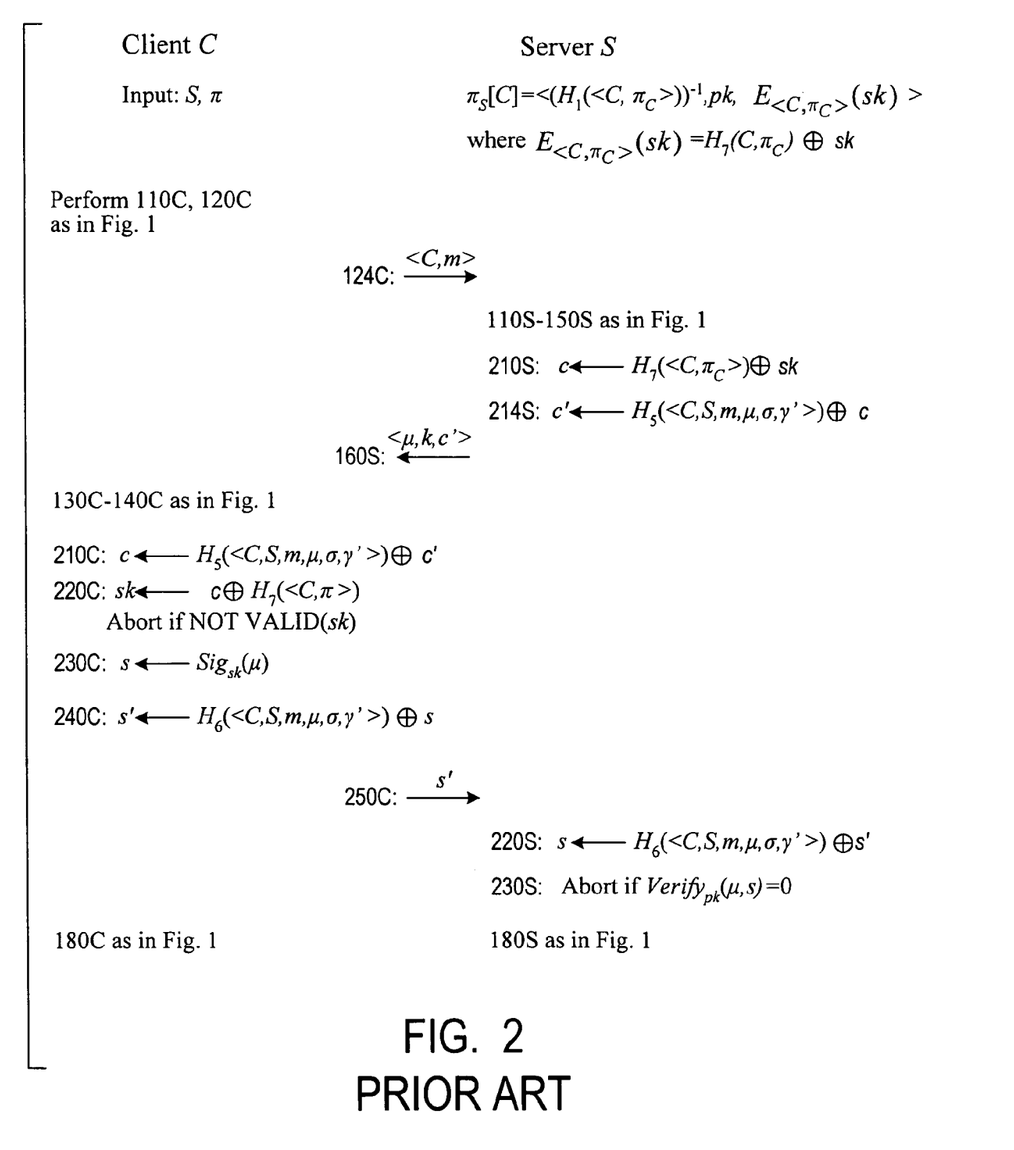

FIG. 2 illustrates a modified protocol "PAK-Z" from [38]. This is an augmented PAKE protocol, requiring the client to prove knowledge of additional information about $\pi$ to the server. For each client C, the server's record $\pi_S[C]$ includes a value $H_1(<C,\pi_C>)^{-1}$, a signature verification key pk for verifying digital signatures according to some signature scheme, and an encryption $E_{<C,\pi_C>}(sk)$ of a signing key sk corresponding to pk:

$$E_{<C,\pi_C>}(sk)=H_7(<C,\pi_C>) \oplus sk \qquad (3)$$

where $H_7(\ )$ is a suitable hash function, e.g. as in (1) or (2). This encryption is called "one-time pad".

The client performs steps 110C-124C as in FIG. 1. The server performs steps 110S-150S as in FIG. 1. In addition, at steps 210S, 214S the server computes an encryption c' of $E_{<C,\pi_C>}(sk)$:

$$c'=H_5(<C,S,m,\mu,\sigma,H_1(<C,\pi>)^{-1}>) \oplus E_{<C,\pi_C>}(sk) \qquad (4)$$

where $H_5$ is some hash function (e.g. as in (1) or (2)). At step 160S, the server sends the value c' together with $\mu$ and k to the client.

The client performs steps 130C, 140C as in FIG. 1. At step 210C, the client decrypts c' to $c=E_{<C,\pi_C>}(sk)$:

$$E_{<C,\pi_C>}(sk)=H_5(<C,S,m,\mu,\sigma,H_1(<C,\pi>)^{-1}>) \oplus c' \qquad (5)$$

At step 220C, the client decrypts $c=E_{<C,\pi_C>}(sk)$ to the signing key sk:

$$sk=c \oplus H_7(<C,\pi>)^{-1} \qquad (6)$$

The client also does some validity checking on sk, and aborts if the check fails. At step 230C, the client computes a digital signature $s=Sig_{sk}(\mu)$ on the server's DH key $\mu$ (see step 120S in FIG. 1) under the key sk. At step 240C, the client encrypts the signature s to a value $$s'=H_6(<C,S,m,\mu,\sigma,H_1(<C,\pi>)^{-1}>) \oplus s \qquad (7)$$

and sends s' to the server (step 250C). At step 220S, the server recovers the signature s by computing:

$$s=H_6(<C,S,m,\mu,\sigma,H_1(<C,\pi>)^{-1}>) \oplus s' \qquad (8)$$

At step 230S, the server verifies the signature with the public key pk obtained from $\pi_S[C]$. If the verification fails, the server aborts. The shared key generation (steps 180C, 180S) is performed as in FIG. 1.

SUMMARY

This section summarizes some features of the invention. The invention is defined by the appended claims.

The inventors have observed that the PAK-Z protocol of FIG. 2 is not very resilient against server compromise for some signature schemes (Sig, Verify); see steps 230C, 230S. If a discrete logarithm (DL) based signature scheme is used (e.g. Schnorr signature scheme, ElGamal, or DSS described in Appendix below), the PAK-Z protocol is vulnerable to an attack which we will call, for ease of reference, "single-bit-malleability attack". In this attack, if an adversary takes over the server, the adversary can determine the signing key sk (in addition to $H_1(<C,\pi_C>)$). Then the adversary can impersonate the client because the adversary can perform the signing step 230C without knowing the password $\pi$.

The attack exploits the following property of the DL based signature schemes. The signing key sk and the corresponding verification key pk=pk(sk) are related such that $$pk(sk)=g^{sk} \qquad (9)$$

where g is an element of a finite cyclic group, and g is known to the signer. Therefore, for any integer j, $$pk(sk+j)=pk(sk) \cdot g^j \qquad (10)$$

so pk(sk+j) can be computed without knowing sk.

The Single-Bit-Malleability Attack proceeds as follows. Referring to step 210S, denote d=|c|, i.e. the bit length of c. Then c can be written as $$c=c_{d-1} \ldots c_0$$

where each $c_i$ is a binary digit. At step 210S, the adversary flips one bit of c, e.g. bit i, to obtain $$c^*(i)=c_{d-1} \ldots c_{i+1} c_i^* c_{i-1} \ldots c_0$$

where $c_i^*=1-c_i$. Referring to the encryption (3), and denoting $\pi=\pi_C$, we can write:

$$c=E_{<C,\pi>}(sk), \text{ and}$$

$$c^*(i)=E_{<C,\pi>}(sk^*(i)) \qquad (11)$$

where sk*(i) is obtained from sk by flipping the i-th bit $sk_i$ of sk. The adversary does not know the i-th bit of sk, but he knows that:

$$sk^*(i)=sk+2^i \text{ if } sk_i=0, \text{ and}$$

$$sk^*(i)=sk-2^i \text{ if } sk_i=1. \qquad (12)$$

The adversary performs the steps 214S, 160S with c*(i) instead of c. On the client side, step 210C outputs c*(i) instead of c. Step 220C outputs sk*(i) instead of sk. If sk*(i) is in the proper range, then VALID(sk*(i)) returns TRUE. Steps 230C, 240C, 250C are performed with sk*(i) instead of sk.

On the server side, step 220S outputs the value s= $\text{Sig}_{sk^*(i)}(\mu)$. Then the adversary computes $$pk^* = pk \cdot g^{2^i} \quad (13)$$

i.e. pk*=pk(sk+$2^i$); see (10). Then the adversary executes $\text{Verify}_{pk^*}(\mu, s)$. If this function returns 1, the adversary concludes that pk(sk+$2^i$) is the verification key corresponding to sk*(i), and hence sk*=sk+$2^i$, i.e. the i-th bit of sk is 0 (see (12)). If $\text{Verify}_{pk^*}(\mu, s)=0$, the adversary concludes that the i-th bit is 1.

The adversary can thus determine all the bits of sk in d executions of the protocol. If d is much smaller than the dictionary of possible passwords, the attack can be much more efficient than an offline dictionary attack.

In some embodiments of the present invention, the one-time pad encryption E of (3) is replaced with some other encryption EE, for example, an essentially non-malleable encryption. In some embodiments, EE is such that if c is an encryption of sk, then c*(i) is not a valid encryption under EE, or c*(i) is a valid encryption of some value sk* but the probability that an adversary can find sk* in a "reasonable time" is "about the same" as the probability that the adversary can find sk* without knowing c (say, by randomly selecting sk* from a pool of values). Here, "reasonable time" means a polynomial time with respect to at least one polynomial in the security parameter κ. The security parameter κ can be any parameter, and can for example be chosen so that with a non-negligible probability, a successful security attack would need about $2^\kappa$ operations. In some embodiments, κ represents the size (e.g. the bit length) of sk. (For example, κ can be one half of the bit length of sk.) The expression that the probabilities are "about the same" means that the probabilities differ by at most a "negligible amount". The "negligible amount" is a value whose magnitude approaches zero faster than the reciprocal of any polynomial in κ when κ approaches infinity. Each probability is defined assuming a uniform distribution on the pertinent set of values.

In some embodiments, the encryption (3) is replaced with an encryption scheme which allows the client to verify the decrypted value sk. For example, the following scheme can be used:

$$EE_{<C,\pi>}(sk) = E_{<C,\pi>}(sk) \| H_8(sk) \quad (14)$$

where $E_{<C,\pi>}(sk)$ is as in (3) and $H_8(\ )$ is a cryptographic hash function. Denote $$c_E = E_{<C,\pi>}(sk), c_V = H_8(sk) \quad (15)$$

Then $$c = c_E \| c_V \quad (16)$$

Suppose the client has obtained $c = EE_{<C,\pi>}(sk)$. The client the $c_E$ portion to sk as in (6), and then compute $H_8(sk)$ and verify that this value is equal to $c_V$.

In some embodiments, the function $H_8(\ )$ is not a cryptographic hash function. For example, this function can be not one-way and/or not collision resistant. In some embodiments, $H_8(\ )$ is such that at least one bit of $H_8(sk)$ depends on at least two bits of sk. In some embodiments, each of one or more bits of $H_8(sk)$, and perhaps each bit of $H_8(sk)$, depends on two or more bits of sk, and perhaps on all of the bits of sk. In addition, $H_8(sk)$ depends on all of the bits of sk in some embodiments (i.e. for any bit position j, there are two sk values which differ only in bit j but the corresponding values $H_8(sk)$ are different). In some embodiments, each of sk and $H_8(sk)$ has at least 80 bits. Other embodiments are also possible.

The invention is not limited to the embodiments described above. The invention is not limited to cases when each party does not have a public key of the other party or a certified public key, or to other cases described above. Other features of the invention are described below. The invention is defined by the appended claims.

DESCRIPTION OF SOME EMBODIMENTS

The present invention will be understood more fully from the detailed description given below and from the accompanying drawings of various embodiments of the invention, which, however, should not be taken to limit the invention to the specific embodiments, but are for explanation and understanding only.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is a method leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing computer instructions, and each coupled to a computer system bus. Computer programs can be also carried by data carrier signals over networks. Thus, the programs can be carried by carrier waves, infrared signals, digital signals, etc.

It is known to one of ordinary skill in the cryptographic arts that the security of many cryptographic inventions relies upon making certain computational intractability assumptions; for example, one may try to prove that a cryptosystem is secure so long as it is difficult to decompose a specific number into its prime factors efficiently. The term "computational" is often used in the art to identify this class of cryptographic inventions. The present invention provides a computational scheme for password authenticated key exchange. The term "information theoretic" or "unconditional" is often used in the art in conjunction with schemes that are mathematically seen to meet a specific meaningful security definition without making any type of assumption.

While it is generally preferable from a pure security perspective not to have any computational assumptions whatsoever, there are instances of problems that cannot be solved without making such an assumption (the present invention serves as such an example). In particular, according to the present state of the art, it is not possible to construct a PAKE scheme without requiring public-key cryptography [22]. Further, it is unknown, according to the present state of the art, how to implement public-key cryptography without making some form of computational assumption. Therefore, all PAKE schemes in the art, including the one described herein, require some form of computational assumption. These assumptions will be described later. Further, it is generally known by those skilled in the art that cryptographic methods can sometimes be made more efficient by incorporating computational assumptions.

It also worth noting that often times one assumption implies another. That is, if one of the assumptions were actually true, then another assumption would be seen to be true by a mathematically logical argument. Typically the means used by those skilled in the art to show such an implication, is a transformation (often known in the art as a reduction) that converts a mechanism for violating the second assumption to a mechanism for violating the first assumption. In such cases, the first assumption is called "stronger" or the second "weaker." In general, weaker assumptions are preferable.

Signature Schemes

A signature scheme S may include a triple ($Gen_S$, Sig, Verify) of algorithms, the first two of which may be probabilistic. In some embodiments, all the three algorithms run in expected polynomial time. $Gen_S$ may take as input the security parameter (usually denoted as κ and represented in unary format, i.e., $1^κ$) and outputs a key pair (pk,sk), i.e., (pk, sk)←$Gen_S(1^κ)$. Sign takes a message m and a signing key sk as input and outputs a signature σ for m, i.e., σ←$Sig_{sk}(m)$. Verify takes a message m, a verification key pk, and a candidate signature σ for m as input and returns an indication of whether σ is a valid signature for m. For example, Verify=$Verify_{pk}(m,σ)$ may return a value 1 if σ is a valid signature for m for the corresponding private key, and otherwise return 0. Naturally, if σ←$Sig_{sk}(m)$, then $Verify_{pk}(m,σ)$=1.

In many cases, sk is kept secret by the signer, and pk is made public. In other cases, both sk and pk are kept secret.

One example of a signature scheme is a Schnorr signature [44]. See also the Appendix below. This example is illustrative only, and should not be taken to limit the invention.

Symmetric Encryption Schemes

A symmetric encryption scheme E is a pair (Enc,Dec) of algorithms. In some embodiments, both algorithms run in expected polynomial time. Enc takes a symmetric key k and a message m as input and outputs an encryption c for m; we denote this c←$Enc_k(m)$. Dec takes a ciphertext c and a symmetric key k as input and returns either a message m such that c is a valid encryption of m, if such an m exists, and otherwise returns some error indication (⊥). We say an encryption scheme is essentially non-malleable if given an encryption c of an unknown message m under an unknown key k, it is difficult to compute a new encryption c'≠c of a related message m' under key k, at least without somehow determining m.

An illustrative example of a symmetric encryption scheme that is not essentially non-malleable is a one-time pad, in which $Enc_k(m)=H(k)⊕m$, where H( ) is a hash function with output that is the same length as m and where ⊕ is taken as a bit-wise exclusive OR operation. See also (3) above. Given a ciphertext c of an unknown message m under an unknown key k, one can construct a ciphertext c*=c⊕00 . . . 001 of a related message m*=m⊕00 . . . 001, i.e., m with the last bit flipped, without determining m. In fact, one can construct the ciphertext c*(i) of any message m*(i) obtained by flipping the i-th bit of m. See (11).

An illustrative example of a symmetric encryption scheme that is essentially non-malleable is a one-time pad concatenated to a cryptographic hash of the message, i.e.

$$Enc_k(m)=H(k)⊕m|H'(m), \tag{17}$$

for a cryptographic hash function H'( ). See also (14). This is essentially non-malleable since if the one-time pad portion is modified, the cryptographic hash would have to be recomputed with the correct message, implying the message has been determined.

Some embodiments of the present invention can be described without referring to the "essentially non-malleable" concept. The invention is not believed to be limited to essentially non-malleable encryption schemes.

Hash Functions

A cryptographic hash function H is a function that satisfies the following properties:

(a) One-way, i.e. given H(x), it is computationally infeasible to find a pre-image z such that H(z)=H(x), except with negligible probability;

(b) Collision resistance or at least weak collision resistance. H( ) is called collision resistant (or "strong collision resistant") if it is computationally infeasible to find $m_1≠m_2$ such that $H(m_1)=H(m_2)$. H( ) is called weak collision resistant if given $m_1$, it is computationally infeasible to find $m_2≠m_1$ such that $H(m_1)=H(m_2)$.

"Computationally infeasible" means that given a security parameter κ, the computation cannot be computed in a time equal to or less than any fixed polynomial in κ except with negligible probability (the probability is negligible in the sense that it approaches zero faster than the reciprocal of any polynomial in κ when κ approaches infinity). The security parameter κ is a measure of the size of H(m), e.g. one half of |H(m)| (where |H(m)| denotes the bit length of H(m)).

It is generally believed in the art that the following functions are one-way and collision resistant: SHA-1 and MD5

(see e.g. RFC-2104, Request for Comments, Networking Working Group, H. Krawczyk et al., *HMAC: Keyed-Hashing for Message Authentication*, February 1997, both incorporated herein by reference). It is believed that the function (1) is one-way and collision-resistant if H( ) is SHA-1 or MD5. It is believed that the function (2) is one-way and collision-resistant if H( ) is SHA-1 or MD5 and p is sufficiently large (e.g. having a bit length equal to or larger than the security parameter). In other words, there are no known algorithms to invert such functions, or to find two different pre-images $m_1$ and $m_2$ of a given function value, or to find a pre-image $m_2$ different from a given $m_1$ such that $m_1$ and $m_2$ are mapped into the same image, in at most a polynomial time in the security parameter except with negligible probability.

To prove security of some embodiments of the present invention, the hash functions would be assumed to behave like black-box perfectly random functions, referred to in the art as random oracles [3]. In [3] there is an extensive discussion on how to instantiate random oracles, and in [23] there is a discussion on key generation functions. However, the invention is not limited to such functions.

Let Π be the set of passwords in the dictionary, and let π denote a single password in Π. A password refers here to some quantity that is known mutually to some preferably small number of parties, and is typically kept otherwise secret. In the context of the present disclosure, a password may refer to any quantity which can be easily mapped to a possibly unique bit string. In some embodiments, the password is easy to memorize. In some embodiments, the bit string is unique, but it is computationally infeasible to find two passwords that map to the same bit string. Furthermore, in the context of the present invention, the terms "password" and "short secret" are synonymous. In addition, the use of the term "short" is only an indication of a preference for an easily memorizable quantity, but should not limit the invention to any specific secret length.

Figure 3:
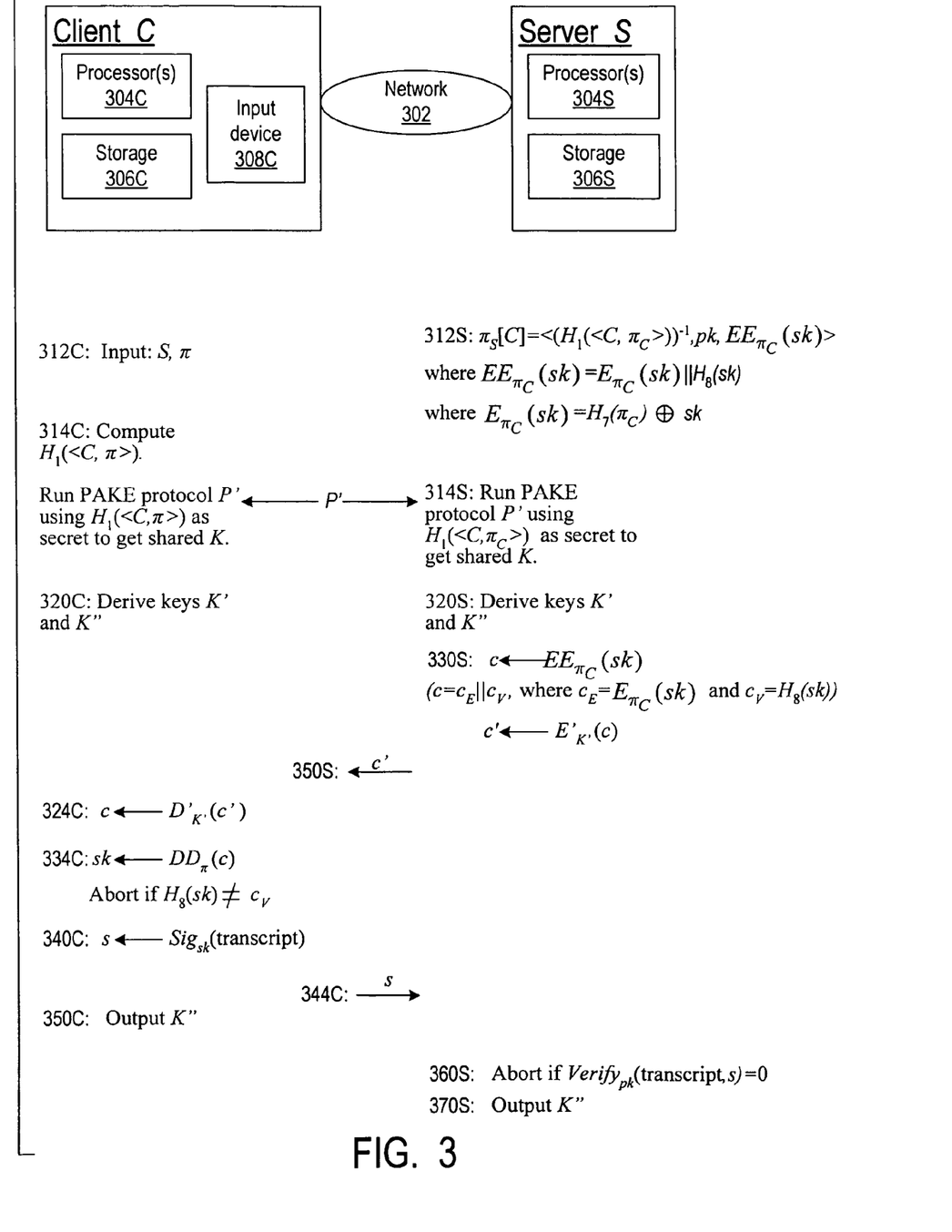
FIG. 3 illustrates a PAKE method according to some embodiments of the present invention.

Some embodiments of the PAKE protocol of the present invention are run between a client computer system C and a server computer system S which communicate with signals transmitted over a network 302 (FIG. 3). Systems C and S can be replaced with any systems, not necessarily client and server. Client C contains one or more computer processors 304C executing computer instructions. Client C also contains computer storage 306C (semiconductor memory, magnetic or optical disks, and/or other types of storage) to store instructions and data. Client C may also contain an input device 308C capable of receiving data such as a password and a server's name S. Server S contains one or more processors 304S to execute computer instructions, and storage 306S to store instructions and data. The client and the server may also contain other equipment as needed.

In some embodiments, the client system C is associated with a password $\pi_C$ (sometimes denoted just π herein). In some embodiments, the password is associated with a human user rather than a computer system. We can think of the client system C as a computer system used by a user associated with a password $\pi_C$. The same computer system may be viewed as a different "client", and associated with a different password, when used by a different user or by the same user using a different password.

In some embodiments, the client system C does not store any per-server information (such as a server certificate) or per-user data (such as a password, or hash of a password). The client system receives the password π and the server identity S as input from the user, as shown in FIG. 3 at 312C. However, the client system may store the description of a protocol, and any public parameters of that protocol. In some embodiments, the server S can store some data record $\pi_S[C]$ for each user. This record may include the user's password $\pi_C$, and/or some function of the password, and/or auxiliary data associated with the user. In the case of PAKE with resilience to server compromise, the server does not store the password, but only some function of the password and auxiliary data. In the case of FIG. 3, as shown at 312S:

$$\pi_S[C] = \langle (H_1(\langle C, \pi_C \rangle))^{-1}, pk, EE_{\pi_C}(sk) \rangle$$

where $(H_1(\langle C, \pi_C \rangle))^{-1}$ is as in FIG. 2, pk and sk are the verification and signing keys respectively for a signature scheme, and EE is the encryption algorithm of some encryption scheme (EE,DD). In some embodiments, the encryption scheme is essentially non-malleable. In some embodiments, the encryption scheme is symmetric. In some embodiments, the encryption algorithm EE generates a verification information which can be used at the decryption stage to verify the validity of the decrypted value. The verification information can be a function (e.g. a cryptographic hash function) of the decrypted value. In some embodiments, EE is as in (14), with some functions $H_7$, $H_8$ (e.g. one-way and, possibly, collision resistant functions), i.e.

$$EE_k(m) = H_7(k) \oplus m \| H_8(m) \tag{18}$$

(the symbols | and ∥ are synonymous, and denote string concatenation). Other embodiments are also possible. For example, the function $H_7$ could depend on C, e.g.

$$EE_{\langle C,k \rangle}(m) = H_7(C,k) \oplus m \| H_8(m) \tag{19}$$

In some embodiments, $H_1(C, \pi_C)$ does not depend on the first argument, i.e. $H_1(C, \pi_C) = H_1(\pi_C)$. Also, the server can store $H_1(C, \pi_C)$ or $H_1(\pi_C)$ instead of $(H_1(C, \pi_C))^{-1}$. In some embodiments, the functions $H_1()$ are one-way. See (1) and (2) for suitable examples.

Protocol description. We construct an augmented PAKE protocol P of FIG. 3 by enhancing a PAKE protocol P' that may or may not be resilient to server compromise. See steps 314C, 314S for the client and the server respectively. In some embodiments, P' is the protocol of FIG. 1. Thus, the client and the server prove to each other the knowledge of $H_1(C, \pi)$ at steps 314C, 314S.

Once P' is finished and has derived a cryptographically strong shared key K, the server uses a temporary session key K' derived from K to securely send $EE_{\pi_C}(sk)$ to the client (as described in detail below for some embodiments). The client uses K and π to derive the appropriate keys and obtain sk, and then creates a signature with sk on the transcript of P'. Alternatively, the client could sign some message dependent on the transcript, such as the part of the transcript contributed by the server. In effect, this proves that the client (the one communicating with the server in protocol P') knows π. The final output of P is another key K" derived from K.

In more detail, one embodiment runs as follows:

Client Part 1: At step 314C, the client computes $H_1(\langle C, \pi \rangle)$ and performs its part in the PAKE protocol P', deriving a shared cryptographic key K. At step 320C, the client computes a key $K' = H_{20}(K)$ using some hash function $H_{20}()$, and a key $K'' = H_{21}(K)$ using some hash function $H_{21}()$. In some embodiments, the functions $H_{20}$, $H_{21}$ are one-way and/or collision resistant.

Server Part 1: At step 314S, the server performs its part in the PAKE protocol P', deriving a shared cryptographic key K. At step 320S, the server computes the keys $K' = H_{20}(K)$ and $K'' = H_{21}(K)$.

In some embodiments, the server and the client do not compute the key K, e.g. in the case of FIG. 1 the steps 180C, 180S can be omitted. Instead, the keys K', K" are computed directly, e.g.:

$$K'=H_{20}(<C,S,m,\mu,\sigma,H_1(C,\pi_C)^{-1}>)$$

$$K''=H_{21}(<C,S,m,\mu,\sigma,H_1(C,\pi_C)^{-1}>)$$

Server Part 2, Step 1: At step 330S, the server reads the value $c=EE_{\pi_C}(sk)$ from the record $\pi_S[C]$, and encrypts this value into $c'=E'_{K'}(EE_{\pi_C}(sk))$ using the key K'. In some embodiments, the encryption method E' is part of a symmetric encryption scheme (E', D'), e.g. a one-time pad:

$$E'_{K'}(m)=H_{22}(K')\oplus m \quad (20)$$

for some hash function $H_{22}( )$ which may or may not be a cryptographic hash function. At step 350S, the server sends the value c' to the client.

Client Part 2, Step 1: The client receives the value c'. The client computes sk by performing decryption. In particular, at step 324C, the client computes $c=D'_{K'}(c')$. For example, for the scheme (20), the client computes $$c=H_{22}(K)\oplus c' \quad (21)$$

At step 334C, the client computes $sk=DD_\pi(c)$. More particularly, let us write c as $$c=c_E\|c_V \quad (22)$$

where $c_E$ are the first j bits of c, where j=|sk|. See also (15), (16). The client computes $$sk=c_E\oplus H_7(\pi) \quad (23)$$

Then the client computes $H_8(sk)$, and aborts if this value is not equal to $c_V$. Optionally, the client may perform some additional validity checking on sk, e.g. to check if sk is in a proper range. Aborting may mean that the client generates a signal indicating an authentication failure, and skips the steps 340C, 344C, and possibly 350C.

At step 340C, the client signs the transcript of P' using sk, i.e., it computes $s=Sig_{sk}(transcript)$. For example, in the case of FIG. 1, the transcript may be the string <C, m, µ, k>, or some part of this string. At step 344C, the client sends the signature s to the server. At step 350C, the client outputs the session key K".

Server Part 2, Step 2: The server receives the signature s, and at step 360S the server computes $b=Verify_{pk}(transcripts)$. If b=0, the server aborts. Otherwise (step 370S), the server outputs the session key K".

The advantage of the protocol of FIG. 3 over the PAK-Z protocol of FIG. 2 is that it provides security for a wider class of signature schemes. An exemplary proof of security can be found in the paper by C. Gentry, P. MacKenzie, Z. Ramzan, "A Method for Making Password-Based Key Exchange Resilient to Server Compromise", submitted to CRYPTO 2006. This paper is to appear in Proceedings of CRYPTO 2006 (Cynthia Dwork, editor), but without the security proof. That proof of security is done in the universal composability framework, and shows that the protocol of FIG. 3 is secure so long as: (1) the underlying digital signature scheme is secure, (2) the underlying hash functions behave like ideal hash functions, and (3) the underlying encryption algorithms are secure. In other words, the security of the protocol is reduced to the security of the underlying building blocks.

Further, the protocol of FIG. 3 can be constructed using any PAKE protocol P' and any signature scheme (Gen, Sig, Verify) for steps 340C, 360S, and these could be chosen based on which cryptographic assumptions are used to prove their security. For instance, one could choose a PAKE protocol P' and a signature scheme that are based on the same cryptographic assumptions. Notice also that in some embodiments, the secret key sk is computed by the client at step 334C using inexpensive Exclusive-OR operations. The invention is not limited to protocols with these advantages however.

As for efficiency, the protocol of FIG. 3 adds one extra round of communication (steps 350S, 344C) along with a few hash operations, symmetric encryption and decryption operations, a signature calculation by the client, and a signature verification by the server, to the PAKE protocol P'. The extra round of communication can sometimes be piggybacked on actual protocol messages, as illustrated in FIG. 2. In particular, in the case when the P' protocol of FIG. 3 is the protocol of FIG. 1, step 350S can be combined with step 160S of FIG. 1, and step 344C can be combined with step 170C. Indeed, at step 350S the server sends the value c' obtained using the key K' derived from K which is derived at step 180S of FIG. 1, but step 180S can be performed before step 160S, so K' can be obtained before step 160S. (Step 320S can be performed before step 160S.) Likewise, on the client side, the signature derivation uses the key K' (step 324C) which can be computed before step 170C because the K computation (step 180C) can be performed before step 170C. There is still the extra computation involved with the signature. Some protocols in the art have been designed specifically for augmented PAKE to avoid this extra computation. (SRP [46] and AMP [33] are two such protocols, but neither has a proof of security, even in the random oracle model.) The invention is not limited to the efficiency features of the protocol of FIG. 3.

Security Parameter Selection

Our protocol includes a cryptographic security parameter κ, or equivalently the "bit-security" of the protocol is selected. (in some embodiments, κ is one half of the output size of $H_8( )$. According to the present state of the art, κ=80 is a reasonable choice, although for some applications of hash functions, the number should probably be increased to κ=128. It will be apparent, however, to one skilled in the art, that the present invention may be practiced without this specific parameter choice.

The invention is not limited to the embodiments described above or to the digital signature schemes presented in the Appendix below. The function $H_8( )$ in FIG. 3 may depend on other values in addition to sk, e.g. on the password, the client's name (C), and possibly other values. Thus, in some embodiments, (14) is replaced with:

$$EE_{<C,\pi>}(sk)=E_{<C,\pi>}(sk)\|H_8(\pi,sk) \quad (24)$$

The invention is not limited to one-way or weak or strong collision resistant functions. Of note, the terms "one-way", "collision resistant", and "essentially non-malleable" were defined in terms of polynomial time. For example, a one-way function is a function which cannot be inverted in a polynomial time except with a negligible probability. However, for a large polynomial P(κ), the security may be adequate for at least some applications even if a pertinent function can be inverted in the polynomial time P(κ) with a non-negligible probability. Also, the negligible probability and the negligible amount were defined as quantities approaching zero faster than the reciprocal of any polynomial. If a polynomial is large, then its reciprocal is small, and adequate security can be obtained even if the pertinent probabilities or amounts are not negligible (i.e. are equal to or greater than the reciprocal of some polynomial). Other embodiments and variations are within the scope of the invention, as defined by the appended claims.

APPENDIX

Signature Schemes for Some Embodiments

1. ElGamal Signature.

1A. Key generation: Generate a random prime p and a primitive root g mod p. Choose a random integer a in the set $\{1, 2, \ldots, p-2\}$. Compute $A=g^a$ mod p. The signing key is a. The verification key is (p, g, A).

1B. Signing: The signing algorithm uses a publicly known collision resistant hash function $$h: \{0,1\}^* \to \{1, 2, \ldots, p-2\}$$

To sign a message $m \in \{0,1\}^*$, choose a random number $k \in \{1, 2, \ldots, p-2\}$ coprime to p−1. Compute $$r = g^k \bmod p, s = k^{-1}(h(m) - ar) \bmod (p-1)$$

where $k^{-1}$ is the inverse of k modulo p−1. The signature is the pair (r,s).

1C. Verification: Accept if, and only if, $1 \leq r \leq p-1$ and $A^r r^s \equiv g^{h(s)} \bmod p$.

2. DSS Signature.

2A. Key generation: Like in ElGamal Signature, except that g does not have to be a primitive root modulo p; g can be any element of $Z_p^*$, of some order q.

2B. Signing: To sign a message $m \in \{0,1\}^*$, choose a random number k coprime to q. Compute $$r = (g^{k^{-1}} \bmod p) \bmod q, s = k(m + xr) \bmod q$$

where $k^{-1}$ is the inverse of k modulo q. The signature is the pair (r,s).

2C. Verification: Accept if, and only if, $r \equiv (g^{ms^{-1}} y^{rs^{-1}} \bmod p) \bmod q$.

3. Schnorr signature.

3A. Key generation: Like ElGamal, but g can be a generator of any (public) group G of prime order p. Also, a is allowed to equal p−1.

3B. Signing: Choose a random integer $k \in \{1, 2, \ldots, p-1\}$. Compute $$r = g^k, e = h(m\|r), s = (k - ah(m\|r)) \bmod p$$

where h is a public hash function. The signature is the pair (e,s).

3C. Verification: Compute $r' = g^s A^{-e}$. Accept iff $e = h(m\|r')$.

REFERENCES

The following documents are incorporated herein by reference except the hyperlink documents [41] and [50]:

[1] M. Abdalla and D. Pointcheval. Simple Password-Based Encrypted Key Exchange Protocols. In *RSA Conference, Cryptographer's Track*, CT-RSA 05, LNCS 3376, pp. 191-208, 2005.

[2] M. Bellare, D. Pointcheval, and P. Rogaway. Authenticated key exchange secure against dictionary attacks. In *EUROCRYPT* 2000 (LNCS 1807), pp. 139-155, 2000.

[3] M. Bellare and P. Rogaway. Random oracles are practical: A paradigm for designing efficient protocols. In $1^{st}$ ACM *Conference on Computer and Communications Security*, pages 62-73, November 1993.

[4] M. Bellare and P. Rogaway. Entity authentication and key distribution. In *CRYPTO '93* (LNCS 773), pp 232-249, 1993.

[5] M. Bellare and P. Rogaway. Provably secure session key distribution-the three party case. In $27^{th}$ *ACM Symposium on the Theory of Computing*, pp. 57-66, 1995.

[6] S. M. Bellovin and M. Merritt. Encrypted key exchange: Password-based protocols secure against dictionary attacks. In *IEEE Symposium on Research in Security and Privacy*, pages 72-84, 1992.

[7] S. M. Bellovin and M. Merritt. Augmented encrypted key exchange: A password-based protocol secure against dictionary attacks and password file compromise. In *ACM Conference on Computer and Communications Security*, pp. 244-250, 1993.

[8] S. M. Bellovin and M. Merritt. Cryptographic Protocol for Secure Communications. U.S. Pat. No. 5,241,599.

[9] S. M. Bellovin and M. Merritt. Cryptographic Protocol for Remote Authentication. U.S. Pat. No. 5,440,635.

[10] D. Bleichenbacher. Personal communication.

[11] D. Boneh. The decision Diffie-Hellman problem. In *Proceedings of the Third Algorithmic Number Theory Symposium* (LNCS 1423), pp. 48-63, 1998.

[12] V. Boyko, P. MacKenzie, and S. Patel. Provably secure password authentication and key exchange using Diffie-Hellman. In *EUROCRYPT* 2000 (LNCS 1807), pp. 156-171, 2000.

[13] R. Canetti, S. Halevi, J. Katz, Y. Lindell, and P. MacKenzie. Universally-composable password-based key exchange. To appear in *Eurocrypt,* 2005.

[14] R. Cox, E. Grosse, R. Pike, D. Presotto, and S. Quinlan. Security in Plan 9. In *Usenix Security Symposium* 2002.

[15] R. Cramer and V. Shoup. A practical public key cryptosystem provably secure against adaptive chosen ciphertext attack. In *CRYPTO '98* (LNCS 1462), pp. 13-25, 1998.

[16] W. Diffie and M. Hellman. New directions in cryptography. *IEEE Trans. Info. Theory*, 22(6):644-654, 1976.

[17] W. Ford and B. S. Kaliski, Jr. Server-assisted generation of a strong secret from a password. In *Proceedings of the $5^{th}$ IEEE International Workshop on Enterprise Security*, 2000.

[18] R. Gennaro and Y. Lindell. A Framework for Password-Based Authenticated Key Exchange. *Advances in Cryptology—Eurocrypt* 2003, LNCS vol. 2656, Springer-Verlag, pp. 524-543, 2003.

[19] O. Goldreich and Y. Lindell. Session-Key Generation using Human Passwords Only. In *CRYPTO* 2001 (LNCS 2139), pp. 408-432, 2001.

[20] L. Gong. Optimal authentication protocols resistant to password guessing attacks. In 8th *IEEE Computer Security Foundations Workshop*, pages 24-29, 1995.

[21] L. Gong, T. M. A. Lomas, R. M. Needham, and J. H. Saltzer. Protecting poorly chosen secrets from guessing attacks. *IEEE Journal on Selected Areas in Communications*, 11(5):648-656, June 1993.

[22] S. Halevi and H. Krawczyk. Public-key cryptography and password protocols *ACM Transactions on Information and System Security* (TISSEC), Vol 2, No. 3, Pages 230-268, August 1999. ACM. (Preliminary version appeared in the 5th ACM-CCS, Pages 122-131. 1998. ACM.

[23] IEEE Standard 1363-2000, Standard specifications for public key cryptography, 2000.

[24] D. Jablon. Strong password-only authenticated key exchange. *ACM Computer Communication Review*, ACM SIGCOMM, 26(5):5-20, 1996.

[25] D. Jablon. Extended password key exchange protocols immune to dictionary attack. In *WETICE' 97 Workshop on Enterprise Security*, 1997.

[26] D. Jablon Password authentication using multiple servers. In *RSA Conference 2001, Cryptographers' Track* (LNCS 2020), pp. 344-360, 2001.

[27] D. Jablon Cryptographic methods for remote authentication. U.S. Pat. No. 6,226,383.

[28] D. Jablon Cryptographic methods for remote authentication. U.S. Pat. No. 6,792,533.

[29] S. Jiang and G. Gong. Password based key exchange with mutual authentication. In *Workshop on Selected Areas of Cryptography* (SAC), 2004.

[30] J. Katz, R. Ostrovsky, and M. Yung. Practical password-authenticated key exchange provably secure under standard assumptions. In *Eurocrypt 2001* (LNCS 2045), pp. 475-494, 2001.

[31] J. Katz and M. Yung. Complete characterization of security notions for probabilistic private-key encryption. In *ACM Symposium on Theory of Computing*, pp. 245-254, 2000.

[32] C. Kaufmann and R. Perlman. PDM: A New Strong Password-Based Protocol. In *Usenix Security Symposium*, 2001.

[33] T. Kwon. Authentication and Key Agreement via Memorable Passwords. In 2001 *Internet Society Network and Distributed System Security Symposium*, 2001.

[34] S. Lucks. Open key exchange: How to defeat dictionary attacks without encrypting public keys. In *Proceedings of the Workshop on Security Protocols*, 1997.

[35] P. MacKenzie, S. Patel, and R. Swaminathan. Password authenticated key exchange based on RSA. In *ASIACRYPT 2000* (LNCS 1976), pp. 599-613, 2000.

[36] P. MacKenzie and R. Swaminathan. Secure mutual network authentication protocol. U.S. Pat. No. 6,757,825.

[37] P. MacKenzie. More Efficient Password-Authenticated Key Exchange, RSA Conference, Cryptographer's Track (LNCS 2020), pp. 361-377, 2001.

[38] P. MacKenzie. The PAK suite: Protocols for password-authenticated key exchange. DIMACS Technical Report 2002-46, October, 2002.

[39] National Institute of Standards and Technology (NIST). Announcing the Secure Hash Standard, FIPS 180-1, U.S. Department of Commerce, April, 1995.

[40] S. Patel. Number theoretic attacks on secure password schemes. In *Proceedings of the IEEE Symposium on Research in Security and Privacy*, pages 236-247, 1997.

[41] Phoenix Technologies. h-t-t-p://w-w-w.phoenix.com/, 2005 (dashes are inserted into "http" and "www" to prevent automatic recognition of the URL by computer software).

[42] R. Rivest, A. Shamir, and L. Adleman. A method for obtaining digital signature and public key cryptosystems. *Communications of the ACM*, 21:120-126, 1978.

[43] M. Roe, B. Christianson, and D. Wheeler. Secure sessions from weak secrets. Technical report, University of Cambridge and University of Hertfordshire, 1998.

[44] C. P. Schnorr. Efficient identification and signatures for smart cards. In *Crypto' 89* (LNCS 435), pp. 235-251, 1990.

[45] M. Steiner, G. Tsudik, and M. Waidner. Refinement and extension of encrypted key exchange. *ACM Operating System Review*, 29:22-30, 1995.

[46] T. Wu. The secure remote password protocol. In 1998 *Internet Society Network and Distributed System Security Symposium*, pages 97-111, 1998.

[47] T. Wu. A real-world analysis of Kerberos password security. In *Proceedings of the* 1999 *Network and Distributed System Security Symposium*, February 1999.

[48] T. Wu. Telnet authentication: SRP. IETF RFC 2944, 2000.

[49] T. Wu. The SRP authentication and key exchange system. IETF RFC 2945, 2000.

[50] T. Wu. SRP open source password utility. h-t-t-p://srp.stanford.edu/, 2005 (dashes are inserted into "http" to prevent automatic recognition of the URL by computer software).

[51] M. Zhang. New Approaches to Password Authenticated Key Exchange Based on RSA. In *ASIACRYPT*, pp. 230-244, 2004.

The invention claimed is:

1. A computer-implemented method for performing a cryptographic authentication in which a first computer system proves a knowledge of a password value $\pi$ to a second computer system, the method comprising the first computer system performing the following operations:

(1) the first computer system executing a protocol in cooperation with the second computer system for proving to at least one of the first and second computer systems that the other one of the first and second computer systems knows a predefined function of the password value $\pi$, the first computer system generating a cryptographic key K' using data used in said protocol;

(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c under a key dependent on the password value $\pi$, wherein the first encryption method does not consist of a one-time pad under a key independent of sk; and (2B) a second encryption method encrypting the first encrypted value c to a second encrypted value using said cryptographic key K';

(3) applying a decryption method to the first value to obtain the signing key;

(4) generating, by the first computer system, a digital signature on a message with the signing key obtained in the operation (3); and (5) sending, by the first computer system, data incorporating the digital signature to the second computer system, to allow the second computer system to verify the digital signature by using the verification key pk;

wherein the first encrypted value c comprises:
a first portion decryptable to the signing key sk; and
a verification portion for verifying the signing key sk,
wherein the operation (3) comprises, by the first computer system, using the verification portion to verify the signing key sk, and indicating an authentication failure and omitting the operation (5) if the verifying of the signing key sk indicates that the signing key sk is invalid.

2. The method of claim 1 wherein the verification portion comprises a value of a function dependent at least on the signing key sk.

3. The method of claim 1 wherein in the first encryption method, at least one bit of the first encrypted value c is a function of at least two bits of the signing key sk.

4. The method of claim 1 further comprising generating, by the first computer system, a cryptographic key K" for communication with the second computer system, the key K" depending on the password value $\pi$.

5. The method of claim 1 wherein the message depends on a transcript of data exchanged between the first and second computer systems before the operation (5).

6. The method of claim 1 wherein in the first encryption method, for at least one value of sk, a change in at least one bit of sk results in a change of a plurality of bits of c.

7. The method of claim 1 wherein the verification key $pk=g^{sk}$ where g is known to the second computer system.

8. The method of claim 1 wherein the verification key pk is a predetermined function of the signing key sk such that if the signing key sk is changed in any one bit to obtain a new signing key sk*, then a corresponding new verification key pk* is computable from the verification key pk without knowing the signing key sk.

9. The method of claim 2 wherein the function is a one-way function of the signing key sk.

10. The method of claim 4 wherein the key K" also depends on a transcript of the authentication.

11. A computer-implemented method for performing a cryptographic authentication in which a first computer system proves a knowledge of a password value π to a second computer system, the method comprising the second computer system performing the following operations:
(1) the second computer system sending and receiving data over a network to execute a protocol proving to the second computer system that the first computer system knows a predefined function of the password value π;
(2) the second computer system obtaining a first encrypted value c equal to an encryption of a signing key sk with a first encryption method using the password value π, wherein the first encryption method does not consist of a one-time pad under a key independent of sk;
(3) the second computer system applying a second encryption method to encrypt the first encrypted value c to a second encrypted value using a cryptographic key K' obtained using data used in said protocol;
(4) the second computer system sending data incorporating the second encrypted value to the first computer system;
(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk;
wherein the first encrypted value c comprises:
a first portion decryptable to the signing key sk; and
a verification portion for verifying the signing key sk;
wherein the verification portion comprises a value of a function dependent at least on the signing key sk.

12. The method of claim 11 wherein the function is a one-way function of the signing key sk.

13. The method of claim 11 wherein in the first encryption method, at least one bit of the first encrypted value c is a function of at least two bits of the signing key sk.

14. The method of claim 11 further comprising the second computer system generating a cryptographic key K" for communication with the first computer system, the key K" depending on the password value π.

15. The method of claim 11 wherein the message depends on a transcript of data exchanged between the first and second computer systems before the operation (5).

16. The method of claim 11 wherein in the first encryption method, for at least one value of sk, a change in at least one bit of sk results in a change of a plurality of bits of c.

17. The method of claim 11 wherein the verification key $pk=g^{sk}$ where g is known to the second computer system.

18. The method of claim 11 wherein the verification key pk is a predetermined function of the signing key sk such that if the signing key sk is changed in any one bit to obtain a new signing key sk*, then a corresponding new verification key pk* is computable from the verification key pk without knowing the signing key sk.

19. The method of claim 14 wherein the key K" also depends on a transcript of the authentication.

20. A first computer system adapted to participate in a method for performing a cryptographic authentication in which the first computer system proves a knowledge of a password value ir to a second computer system, the method comprising the first computer system performing the following operations:
(1) the first computer system executing a protocol in cooperation with the second computer system for proving to at least one of the first and second computer systems that the other one of the first and second computer systems knows a predefined function of the password value π, the first computer system generating a cryptographic key K' using data used in said protocol;
(2) receiving, at the first computer system, a first value over the network, the first value purporting to incorporate an encryption of a signing key sk which corresponds to a predefined verification key pk, the encryption being obtainable by:
(2A) a first encryption method encrypting the signing key to a first encrypted value c under a key dependent on the password value π, wherein the first encryption method does not consist of a one-time pad under a key independent of sk; and
(2B) a second encryption method encrypting the first encrypted value c to a second encrypted value using said cryptographic key
(3) applying a decryption method to the first value to obtain the signing key;
(4) generating, by the first computer system, a digital signature on a message with the signing key obtained in the operation (3); and
(5) sending, by the first computer system, data incorporating the digital signature to the second computer system, to allow the second computer system to verify the digital signature by using the verification key pk;
wherein the first encrypted value c comprises:
a first portion decryptable to the signing key sk; and
a verification portion for verifying the signing key sk;
wherein the operation (3) comprises, by the first computer system, using the verification portion to verify the signing key sk, and indicating an authentication failure and omitting the operation (5) if the verifying of the signing key sk indicates that the signing key sk is invalid.

21. A non-transitory computer-readable manufacture comprising one or more computer-readable computer instructions operable to cause a first computer system to participate in a method for performing a cryptographic authentication in which the first computer system proves a knowledge of a password value π to a second computer system, the method comprising the first computer system performing the following operations:
(1) the first computer system executing a protocol in cooperation with the second computer system for proving to at least one of the first and second computer systems that the other one of the first and second computer systems knows a predefined function of the password value π, the first computer system generating a cryptographic key K' using data used in said protocol;
(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c under a key dependent on the password value $\pi$, wherein the first encryption method does not consist of a one-time pad under a key independent of sk; and (2B) a second encryption method encrypting the first encrypted value c to a second encrypted value using said cryptographic key K';

(3) applying a decryption method to the first value to obtain the signing key;

(4) generating, by the first computer system, a digital signature on a message with the signing key obtained in the operation (3); and (5) sending, by the first computer system, data incorporating the digital signature to the second computer system, to allow the second computer system to verify the digital signature by using the verification key pk;

wherein the first encrypted value c comprises:

a first portion decryptable to the signing key sk; and a verification portion for verifying the signing key sk;

wherein the operation (3) comprises, by the first computer system, using the verification portion to verify the signing key sk, and indicating an authentication failure and omitting the operation (5) if the verifying of the signing key sk indicates that the signing key sk is invalid.

22. A second computer system adapted to participate in a method for performing a cryptographic authentication in which a first computer system proves a knowledge of a password value $\pi$ to the second computer system, the method comprising the second computer system performing the following operations:

(1) the second computer system sending and receiving data over a network to execute a protocol proving to the second computer system that the first computer system knows a predefined function of the password value $\pi$;

(2) the second computer system obtaining a first encrypted value c equal to an encryption of a signing key sk with a first encryption method using the password value $\pi$, wherein the first encryption method does not consist of a one-time pad under a key independent of sk;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk;

wherein the first encrypted value c comprises:

a first portion decryptable to the signing key sk; and a verification portion for verifying the signing key sk;

wherein the verification portion comprises a value of a function dependent at least on the signing key sk.

23. A non-transitory computer-readable manufacture comprising one or more computer instructions operable to cause a second computer system to participate in a method for performing a cryptographic authentication in which a first computer system proves a knowledge of a password value $\pi$ to the second computer system, the method comprising the second computer system performing the following operations:

(1) the second computer system sending and receiving data over a network to execute a protocol providing to the second computer system that the first computer system knows a predefined function of the password value $\pi$;

(2) the second computer system obtaining a first encrypted value c equal to an encryption of a signing key sk with a first encryption method using the password value $\pi$, wherein the first encryption method does not consist of a one-time pad under a key independent of sk;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk;

wherein the first encrypted value c comprises:

a first portion decryptable to the signing key sk; and a verification portion for verifying the signing key sk;

wherein the verification portion comprises a value of a function dependent at least on the signing key sk.

24. A computer-implemented method for performing a cryptographic authentication in which a first computer system proves a knowledge of a password value $\pi$ to a second computer system, the method comprising the first computer system performing the following operations:

(1) the first computer system executing a protocol in cooperation with the second computer system for proving to at least one of the first and second computer systems that the other one of the first and second computer systems knows a predefined function of the password value $\pi$, the first computer system generating a cryptographic key K' using data used in said protocol;

(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c, wherein the first encryption method is essentially non-malleable; and (2B) a second encryption method encrypting the first encrypted value c to a second encrypted value using said cryptographic key K';

(3) applying a decryption method to the first value to obtain the signing key;

(4) generating a digital signature on a message with the signing key obtained in the operation (3); and (5) sending data incorporating the digital signature to the second computer system, to allow the second computer system to verify the digital signature by using the verification key pk.

25. A computer-implemented method for performing a cryptographic authentication in which a first computer system proves a knowledge of a password value $\pi$ to a second computer system, the method comprising the second computer system performing the following operations:

(1) the second computer system sending and receiving data over a network to execute a protocol proving to the second computer system that the first computer system knows a predefined function of the password value $\pi$;

(2) the second computer system obtaining a first encrypted value c equal to an essentially non-malleable encryption of a signing key sk with a first encryption method using the password value $\pi$, wherein the first encryption method is essentially non-malleable;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk.

26. A first computer system adapted to participate in a method for performing a cryptographic authentication in which the first computer system proves a knowledge of a password value $\pi$ to a second computer system, the method comprising the first computer system performing the following operations:

(1) executing a protocol by the first and second computer systems for proving to at least one of the first and second computer systems that the other one of the first and second computer systems knows a predefined function of the password value $\pi$, the first computer system generating a cryptographic key K' using data used in said protocol;

(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c, wherein the first encryption method is essentially non-malleable; and (2B) a second encryption method encrypting the first encrypted value c to a second encrypted value using said cryptographic key K';

(3) applying a decryption method to the first value to obtain the signing key;

(4) generating a digital signature on a message with the signing key obtained in the operation (3); and (5) sending data incorporating the digital signature to the second computer system, to allow the second computer system to verify the digital signature by using the verification key pk.

27. A non-transitory computer-readable manufacture comprising one or more computer instructions operable to cause a first computer system to participate in a method for performing a cryptographic authentication in which the first computer system proves a knowledge of a password value $\pi$ to a second computer system, the method comprising the first computer system performing the following operations:

(1) executing a protocol by the first and second computer systems for proving to at least one of the first and second computer systems that the other one of the first and second computer systems knows a predefined function of the password value $\pi$, the first computer system generating a cryptographic key K' using data used in said protocol;

(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c, wherein the first encryption method is essentially non-malleable; and (2B) a second encryption method encrypting the first encrypted value c to a second encrypted value using said cryptographic key K';

(3) applying a decryption method to the first value to obtain the signing key;

(4) generating a digital signature on a message with the signing key obtained in the operation (3); and (5) sending data incorporating the digital signature to the second computer system, to allow the second computer system to verify the digital signature by using the verification key pk.

28. A second computer system adapted to participate in a method for performing a cryptographic authentication in which a first computer system proves a knowledge of a password value $\pi$ to the second computer system, the method comprising the second computer system performing the following operations:

(1) the second computer system sending and receiving data over a network to execute a protocol proving to the second computer system that the first computer system knows a predefined function of the password value $\pi$;

(2) the second computer system obtaining a first encrypted value c equal to an essentially non-malleable encryption of a signing key sk with a first encryption method using the password value $\pi$, wherein the first encryption method is essentially non-malleable;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk.

29. A non-transitory computer-readable manufacture comprising one or more computer instructions operable to cause a second computer system to participate in a method for performing a cryptographic authentication in which a first computer system proves a knowledge of a password value $\pi$ to the second computer system, the method comprising the second computer system performing the following operations:

(1) the second computer system sending and receiving data over a network to execute a protocol proving to the second computer system that the first computer system knows a predefined function of the password value $\pi$;

(2) the second computer system obtaining a first encrypted value c equal to an essentially non-malleable encryption of a signing key sk with a first encryption method using the password value $\pi$, wherein the first encryption method is essentially non-malleable;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk.

30. A network transmission method comprising carrying, over a network, data carrier signals comprising one or more computer-readable computer instructions operable to cause a first computer system to participate in a method for performing a cryptographic authentication in which the first computer system proves a knowledge of a password value π to a second computer system, the method comprising the first computer system performing the following operations:

(1) the first computer system executing a protocol in cooperation with the second computer system for proving to at least one of the first and second computer systems that the other one of the first and second computer systems knows a predefined function of the password value π, the first computer system generating a cryptographic key K' using data used in said protocol;

(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c under a key dependent on the password value π, wherein the first encryption method does not consist of a one-time pad under a key independent of sk; and (2B) a second encryption method encrypting the first encrypted value c to a second encrypted value using said cryptographic key K';

(3) applying a decryption method to the first value to obtain the signing key;

(4) generating, by the first computer system, a digital signature on a message with the signing key obtained in the operation (3); and (5) sending, by the first computer system, data incorporating the digital signature to the second computer system, to allow the second computer system to verify the digital signature by using the verification key pk;

wherein the first encrypted value c comprises:
a first portion decryptable to the signing key sk; and
a verification portion for verifying the signing key sk;
wherein the operation (3) comprises, by the first computer system, using the verification portion to verify the signing key sk, and indicating an authentication failure and omitting the operation (5) if the verifying of the signing key sk indicates that the signing key sk is invalid.

31. A network transmission method comprising carrying, over a network, data carrier signals comprising one or more computer instructions operable to cause a second computer system to participate in a method for performing a cryptographic authentication in which a first computer system proves a knowledge of a password value π to the second computer system, the method comprising the second computer system performing the following operations:

(1) the second computer system sending and receiving data over a network to execute a protocol proving to the second computer system that the first computer system knows a predefined function of the password value π;

(2) the second computer system obtaining a first encrypted value c equal to an encryption of a signing key sk with a first encryption method using the password value π, wherein the first encryption method does not consist of a one-time pad under a key independent of sk;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk;

wherein the first encrypted value c comprises:
a first portion decryptable to the signing key sk; and
a verification portion for verifying the signing key sk;
wherein the verification portion comprises a value of a function dependent at least on the signing key sk.

32. A network transmission method comprising carrying, over a network, data carrier signals comprising one or more computer instructions operable to cause a first computer system to participate in a method for performing a cryptographic authentication in which the first computer system proves a knowledge of a password value π to a second computer system, the method comprising the first computer system performing the following operations:

(1) executing a protocol by the first and second computer systems for proving to at least one of the first and second computer systems that the other one of the first and second computer systems knows a predefined function of the password value n, the first computer system generating a cryptographic key K' using data used in said protocol;

(2) receiving, at the first computer system, a first value over the network, the first value purporting to incorporate an encryption of a signing key sk which corresponds to a predefined verification key pk, the encryption being obtainable by:

(2A) a first encryption method encrypting the signing key to a first encrypted value c, wherein the first encryption method is essentially non-malleable; and (2B) a second encryption method encrypting the first encrypted value c to a second encrypted value using said cryptographic key K';

(3) applying a decryption method to the first value to obtain the signing key;

(4) generating a digital signature on a message with the signing key obtained in the operation (3); and (5) sending data incorporating the digital signature to the second computer system, to allow the second computer system to verify the digital signature by using the verification key pk.

33. A network transmission method comprising carrying, over a network, data carrier signals comprising one or more computer instructions operable to cause a second computer system to participate in a method for performing a cryptographic authentication in which a first computer system proves a knowledge of a password value π to the second computer system, the method comprising the second computer system performing the following operations:

(1) the second computer system sending and receiving data over a network to execute a protocol proving to the second computer system that the first computer system knows a predefined function of the password value π;

(2) the second computer system obtaining a first encrypted value c equal to an essentially non-malleable encryption of a signing key sk with a first encryption method using the password value π, wherein the first encryption method is essentially non-malleable;

(3) the second computer system applying a second encryption method to encrypt the first encrypted value c to a second encrypted value using a cryptographic key K' obtained using data used in said protocol;

(4) the second computer system sending data incorporating the second encrypted value to the first computer system;

(5) the second computer system receiving a value over the network and applying a verification method with a verification key corresponding to the signing key sk, to verify that the value received is a valid signature on a message and, therefore, that the first computer system has been able to decrypt the second encrypted value to obtain the signing key sk.

* * * * *